June 11, 1957 K. LEHOVEC 2,795,743
TRANSISTOR CONSTRUCTION
Filed May 13, 1953
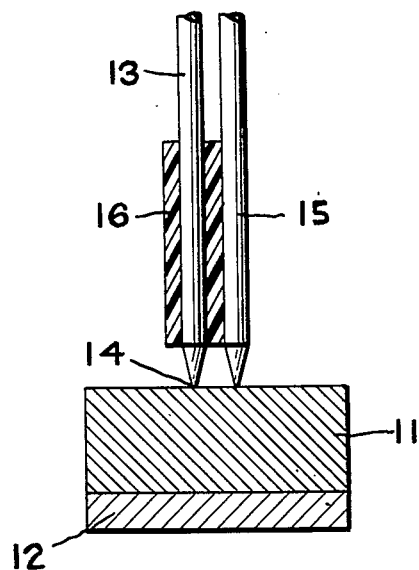
INVENTOR.
KURT LEHOVEC
BY
*Connolly and Hutz*
HIS ATTORNEYS

United States Patent Office 2,795,743
Patented June 11, 1957

2,795,743

TRANSISTOR CONSTRUCTION

Kurt Lehovec, Williamstown, Mass., assignor to Sprague Electric Company, North Adams, Mass., a corporation of Massachusetts Application May 13, 1953, Serial No. 354,789

6 Claims. (Cl. 317—235)

The present invention relates to a new and improved type of point contact transistor.

In the prior art there has been a considerable problem of spacing two point contacts used with this type of device so that they are close enough to one another that a satisfactory amount of interaction is achieved between them. Unfortunately, the prior techniques have not been completely satisfactory due to the inherent difficulty of placing the probes in a point contact transistor in proper relationship to another.

It is an object of this invention to overcome the disadvantages of the prior art constructions of point contact transistors. A further object is to produce a new and improved type of point contact transistor. These and other objects of the invention will be apparent from the following description, the appended claims, as well as the accompanying drawing in which the single figure diagrammatically shows a transistor of the instant invention.

Briefly, the above aims are achieved by utilizing a transistor construction in which there is employed at least one welded wire electrode which serves as a guide for the positioning of the second point contact.

Perhaps this construction will be best explained with reference to the accompanying drawing. Here there is shown a transistor consisting of a body of semi-conductive material 11, such as, for example, either p or n type germanium to which there is attached in accordance with known techniques a low resistance base electrode 12. Against the body 11 a point contact 13 is positioned so as to be welded to the semi-conductive material 11 at the spot 14. A second electrode 15 is positioned against the body 11 after the first welded electrode 13 is positioned as by the use of micromanipulator techniques. The positioning of this second electrode, and the biasing of it in position is relatively simple inasmuch as the first electrode is completely fixed in position by virtue of the fact that it is welded at the spot 14 to the body 11. If desired, the second electrode 15 may also be welded in place against this same body.

In order to prevent "shorting" between the two electrodes, as well as to aid in the positioning of the second electrode, it is advisable to cover the external surface of the first electrode 13 with a cylinder of an inert nonconductive plastic material 16. This material can easily be applied by dipping the entire initial first electrode 13 in resinous material prior to its use, and then by scraping away any unwanted resin. A suitable plastic is polyethylene, although other materials may also be used. When such a cylindrical layer is used, the second electrode 15 can be conveniently positioned by merely being placed up against the cylinder 16.

For convenience in welding, as well as other reasons, the welded electrodes preferably consist of thin flexible wires having a diameter of approximately 2 mills, composed of gold with impurities so as to cause the opposite type of conduction to that present in the semiconductor, e. g. if the semi-conductor material is germanium containing antimony which makes it n-type; then gallium or another element in group III of the periodic table comprises the impurity in the gold wire. Such wires can be conveniently welded in place by passing a current through the electrode when it is placed against a body of semiconductive material, such as, for example, p or n type germanium for a short period. This welding procedure is well known to the art. The second electrode as indicated above can also be welded in place, although satisfactory results are obtained by merely positioning this electrode with the aid of pressure from a spring.

For commercial production the technique can be varied in accordance with the present invention by first positioning a pressure point contact against the semi-conducting material by the use of standard techniques and thereafter permanently fixing same in position by mechanical means well-known to the art. The second electrode is thereafter positioned against the body by micromanipulator techniques at such a point that electrical characteristics of the transistor element are satisfactory. This second electrode is thereafter welded into position so as to firmly affix its point contact to the surface of the semi-conductive body at the desired location. This positioning of the second electrode makes it possible to achieve the desired electrical characteristics in a simple fashion and in a manner which is easily susceptible of commercial production by semi-skilled technicians. As indicated above, both electrodes may be welded in place against the surface of the semi-conductive body.

As many apparently widely different embodiments of my invention may be made without departing from the spirit and scope hereof, it is to be understood that my invention is not limited to the specific embodiments hereof except as defined in the appended claims.

What is claimed is:

1. A new and improved point contact transistor comprising a body of a semi-conductive material, a low resistance base electrode attached to said body, a rectifying point contact electrode welded to said body, and a second rectifying point contact electrode positioned against said body immediately adjacent to said welded electrode.

2. A transistor as defined in claim 1 above wherein said welded electrode is sheathed with an insulating cylinder of a dielectric resinous material, and wherein said second point contact electrode is positioned against said cylinder.

3. The transistor as defined in claim 1 wherein said welded point contact electrode is of gold.

4. The transistor of claim 1 wherein both of said point contact electrodes are welded to said semi-conductive body.

5. A process of forming a point contact transistor which comprises welding a first rectifying point contact electrode to a body of semi-conductive material, and positioning a second rectifying point contact electrode against said body of semi-conductive material adjacent to said welded electrode.

6. A process of forming a multiple point contact transistor which comprises positioning a first rectifying point contact electrode against a body of the semi-conductive material and thereafter welding a second rectifying point contact electrode to the body of said semi-conductive material adjacent to said first point contact electrode.

References Cited in the file of this patent

UNITED STATES PATENTS

| | | |
|---|---|---|
| 2,563,503 | Wallace | Aug. 7, 1951 |
| 2,609,428 | Law | Sept. 2, 1952 |
| 2,629,672 | Sparks | Feb. 24, 1953 |
| 2,646,536 | Benzer et al. | July 21, 1953 |